(12) United States Patent
Denoue et al.

(10) Patent No.: US 8,054,332 B2
(45) Date of Patent: Nov. 8, 2011

(54) ADVANCED INPUT CONTROLLER FOR MULTIMEDIA PROCESSING

(75) Inventors: Laurent Denoue, Palo Alto, CA (US); Scott Carter, Los Altos, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 712 days.

(21) Appl. No.: 11/869,979

(22) Filed: Oct. 10, 2007

(65) Prior Publication Data

US 2009/0073267 A1    Mar. 19, 2009

Related U.S. Application Data

(60) Provisional application No. 60/994,501, filed on Sep. 19, 2007.

(51) Int. Cl.
   *H04N 5/225* (2006.01)
   *H04N 5/232* (2006.01)
   *G06F 3/033* (2006.01)
   *G09G 5/00* (2006.01)

(52) U.S. Cl. ............ 348/207.1; 348/211.7; 348/211.9; 345/158; 345/162

(58) Field of Classification Search ........... 348/207.1, 348/211.4, 211.7, 211.9, 333.01–333.03, 348/333.12; 345/157, 158, 162
See application file for complete search history.

(56) References Cited

U.S. PATENT DOCUMENTS

| | | | | |
|---|---|---|---|---|
| 5,926,168 | A * | 7/1999 | Fan | 345/158 |
| 6,738,041 | B2 * | 5/2004 | Silber | 345/158 |
| 7,486,274 | B2 * | 2/2009 | Forlines et al. | 345/157 |
| 2001/0010514 | A1 * | 8/2001 | Ishino | 345/158 |
| 2006/0152488 | A1 * | 7/2006 | Salsman et al. | 345/158 |
| 2007/0211027 | A1 * | 9/2007 | Ohta | 345/158 |
| 2008/0062124 | A1 * | 3/2008 | Kim et al. | 345/157 |
| 2009/0046061 | A1 * | 2/2009 | Denoue et al. | 345/158 |
| 2009/0066647 | A1 * | 3/2009 | Kerr et al. | 345/158 |
| 2009/0066648 | A1 * | 3/2009 | Kerr et al. | 345/158 |

OTHER PUBLICATIONS

Wikipedia—Splines (mathematics), http://en.wikipedia.org/wiki/Spline_(mathematics), accessed Aug. 25, 2010.*
Wikipedia—Splines (mathematics), http://en.wikipedia.org/wiki/Spline_(mathematics), published Sep. 13, 2006; provided by the wayback machine (www.archive.org) accessed at http://web.archive.org/web/20060913000000/http://en.wikipedia.org/wiki/Spline_(mathematics).*
Adobe SlideShow at http://www.adobe.com/products/photoshopelwin/samples/slideshow_travel.html, 2008.
Jiang, Hao, et al. Direct Pointer: Direct Manipulation for Large-Display Interaction using Handheld Cameras, CHI 2006.
MuveeShow at http://www.muvee.com/en/products/mshow/, May 13, 2008.
Hua, Xian-Sheng, et al., Photo2Video, ACM Multimedia 2003.

* cited by examiner

*Primary Examiner* — Daniel M Pasiewicz
(74) *Attorney, Agent, or Firm* — Sughrue Mion, PLLC

(57) ABSTRACT

The system and method enables people to use their webcam as a virtual flashlight over their screen as a picture or video clip is playing. The position, tilt and rotation of the flashlight over the screen is recorded and smoothed to generate a compelling movie. Users move the webcam closer to the screen to focus on a specific area; users can rotate the webcam to generate compelling rotations, and users can pan the webcam to simulate looking at objects from a side.

18 Claims, 3 Drawing Sheets

ADVANCED INPUT CONTROLLER FOR MULTIMEDIA PROCESSING

CROSS-REFERENCE TO RELATED APPLICATION

This application claims the benefit of priority to U.S. Provisional Patent Application No. 60/994,501 filed on Sep. 19, 2007, which is incorporated by reference in its entirety for all purposes as if fully set forth herein.

FIELD OF THE INVENTION

The present invention generally relates to multimedia processing and more specifically to generating pan and scan in a computerized multimedia processing environment.

DESCRIPTION OF THE RELATED ART

With digital cameras and mobile phones, users accumulate a lot of pictures and video clips. Programs such as Adobe Photoshop Elements SlideShow editor are popular to manually generate compelling slideshows out of a series of pictures where the user can apply pan and zoom. Automatically generated slideshows have also used zooming and scanning over the surface of a picture, and this has been extended to video clips as well.

Thus at one end of the spectrum, programs such as Adobe's are hard to use and require a lot of effort from users; at the other end of the spectrum, automatically produced videos from pictures lack the personal touch: they quickly feel boring, predictable and of course lack any sense of personalization. While standard video editing and screen capture tools are useful for some editing tasks, they have two main drawbacks: (1) they require users to import and organize media in a separate interface, and (2) they do not support natural (or camcorder-like) screen recording instead usually requiring the user to define a specific region or window to record.

One method of implementing camcorder-like controls for video editing is simply to use a camcorder to create a movie of images or video displayed on a computer screen. However, because in this case the camcorder would be used to create a second copy video recorded using such technique would suffer from an inevitable quality degradation.

Thus, none of the existing technologies provide the user with a capability of generating compelling, personalized videos out of pictures and movie clips in a natural way.

SUMMARY OF THE INVENTION

The inventive methodology is directed to methods and systems that substantially obviate one or more of the above and other problems associated with conventional techniques for multimedia processing.

In accordance with one aspect of the inventive concept, there is provided an input control system including an processing controller operable to cause an image feature to be created on a display showing a multimedia material; and a camera operatively coupled to the processing controller and operable to generate an image of the image feature. The processing controller is configured to use the image of the image feature to iteratively update a position of the image feature on the display, the position of the image feature being determined by a position of the camera; record the position of the image feature for each iteration; and transform the multimedia material based on the recorded position of the image feature.

In accordance with another aspect of the inventive concept, there is provided a method involving creating an image feature on a display showing a multimedia material; generating an image of the image feature using a camera; using the image of the image feature to iteratively update a position of the image feature on the display. The position of the image feature being determined by a position of the camera. The inventive method further involves recording the position of the image feature for each iteration and transforming the multimedia material based on the recorded position of the image feature.

In accordance with yet another aspect of the inventive concept, there is provided a computer-readable medium embodying computer-readable instructions implementing a method involving creating an image feature on a display showing a multimedia material; generating an image of the image feature using a camera; using the image of the image feature to iteratively update a position of the image feature on the display. The position of the image feature being determined by a position of the camera. The method further involving recording the position of the image feature for each iteration and transforming the multimedia material based on the recorded position of the image feature.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive technique is an input controller (viewport) that enables a user to easily generate view parameters, such as pan, scan and zoom for images, video or other multimedia displayed on screen of user's monitor and to create custom multimedia presentations using the newly generated views. Specifically, one embodiment of the inventive input controller system enables people use their webcam as a virtual flashlight over their screen as a picture or video clip is playing on the screen. The position, tilt and rotation of the web-cam-flashlight over the screen is recorded and smoothed to generate a compelling movie by transforming the multimedia file using the view parameters (such as pan, scan and zoom) obtained from the position of the web camera or other pointing device held by the user. Users are able to move the webcam closer to the screen to focus on a specific area; users can rotate the webcam to generate compelling rotations, and users can pan the webcam to simulate looking at objects from a side. All user's moves are recorded and the system then generates a new movie or other multimedia presentation by transforming the original multimedia material as determined by the user's interaction with the inventive system.

Figure 1:
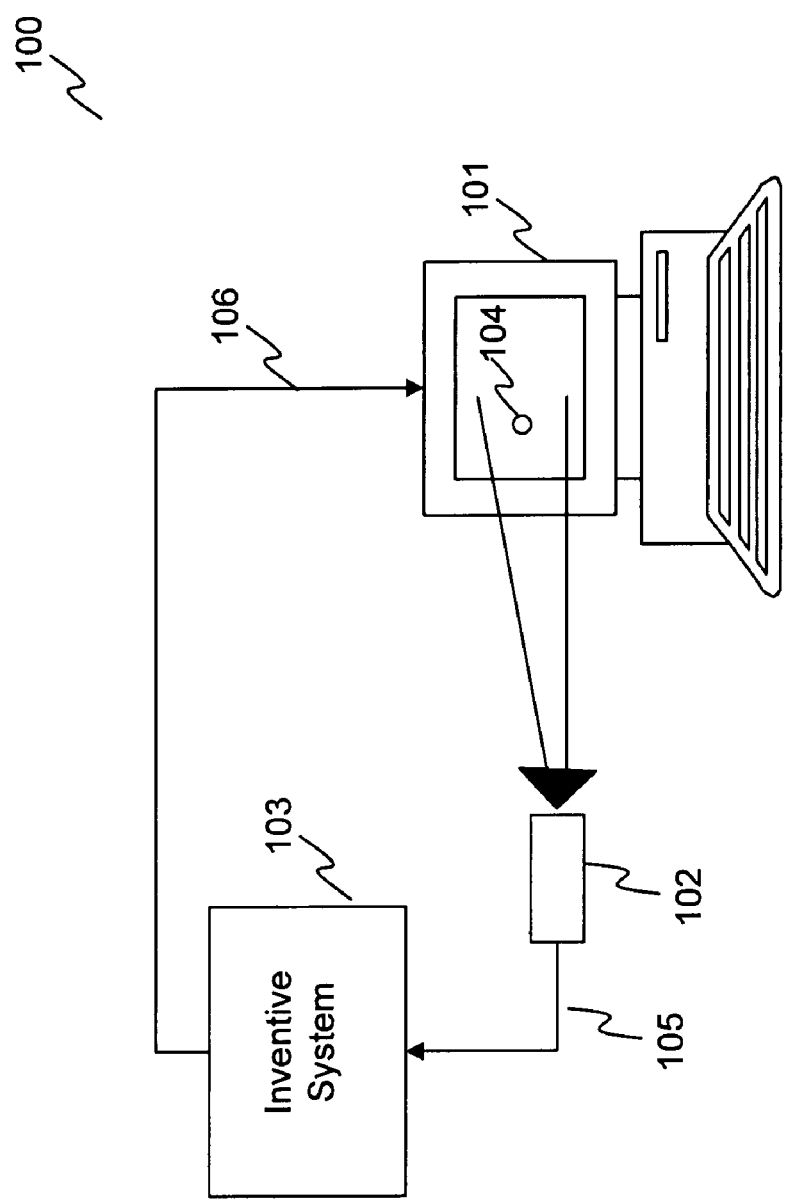
FIG. 1 illustrates an exemplary embodiment of an inventive system.

FIG. 1 illustrates an exemplary embodiment of an inventive system. Specifically, in the illustrated embodiment 100, the system includes a pointing device in a form of a camera 102 directed at a monitor 101. The embodiment of the inventive system reads the orientation and position of the camera 102 using a feature 104, which is displayed on the monitor 101. The monitor 101 also displays a multimedia content that the user wishes to transform (not shown). The image information 105 from the camera 102 is sent to an inventive processing unit 103. This unit sends an adjustment signal 106 to the monitor 101. The signal 106 adjusts the position of the feature 104. The system 100 continuously records the position and orientation of the camera 102 and uses this information to transform the multimedia content shown on the monitor 101.

With an embodiment of the inventive system, users move their camera 102, which may be a webcam, over the screen 101. Users can zoom in and out of the picture, scan it, move from point to point (e.g. face to face, follow a line, etc.). The embodiment of the inventive system 100 provides a real-time feedback to the user: as they move the camera 102, the feature 104, such as a circle, rectangle or quadrilateral, is drawn over the multimedia media elements (e.g. picture or video clip) to indicate the current location and orientation of the camera 102. In essence, using the shown embodiment of the inventive system is similar to holding a flashlight over a screen: the size of the beam tells users how much of their picture will be used in the final animation.

In addition to zoom, scan and rotation, an embodiment of the inventive system is able to detect panning (pivot of the camera left and right) and tilting (pivot of the camera). These two additional dimensions add realism to the final animation in that panning and tilting improve the realism of the animation where users perceive it as really moving around a 3D object, even though the surface imaged remains flat.

Operation of the inventive system will now be described. First, the user chooses a media element to display, such as a picture or a video clip. In one embodiment the inventive system applies a filter to this element so as to remove components that are used by the virtual flashlight, for example blue. This applies to pictures but also to video clips. For example, a bitmap filter can be applied in real-time in Actionscript/Flash to remove blue components of all frames before they are drawn on the display. After that, an embodiment of the inventive system overlays a virtual flash light such as a blue circle, rectangle or quadrilateral at a given position on the display, for example at the center of the screen.

Figure 2:
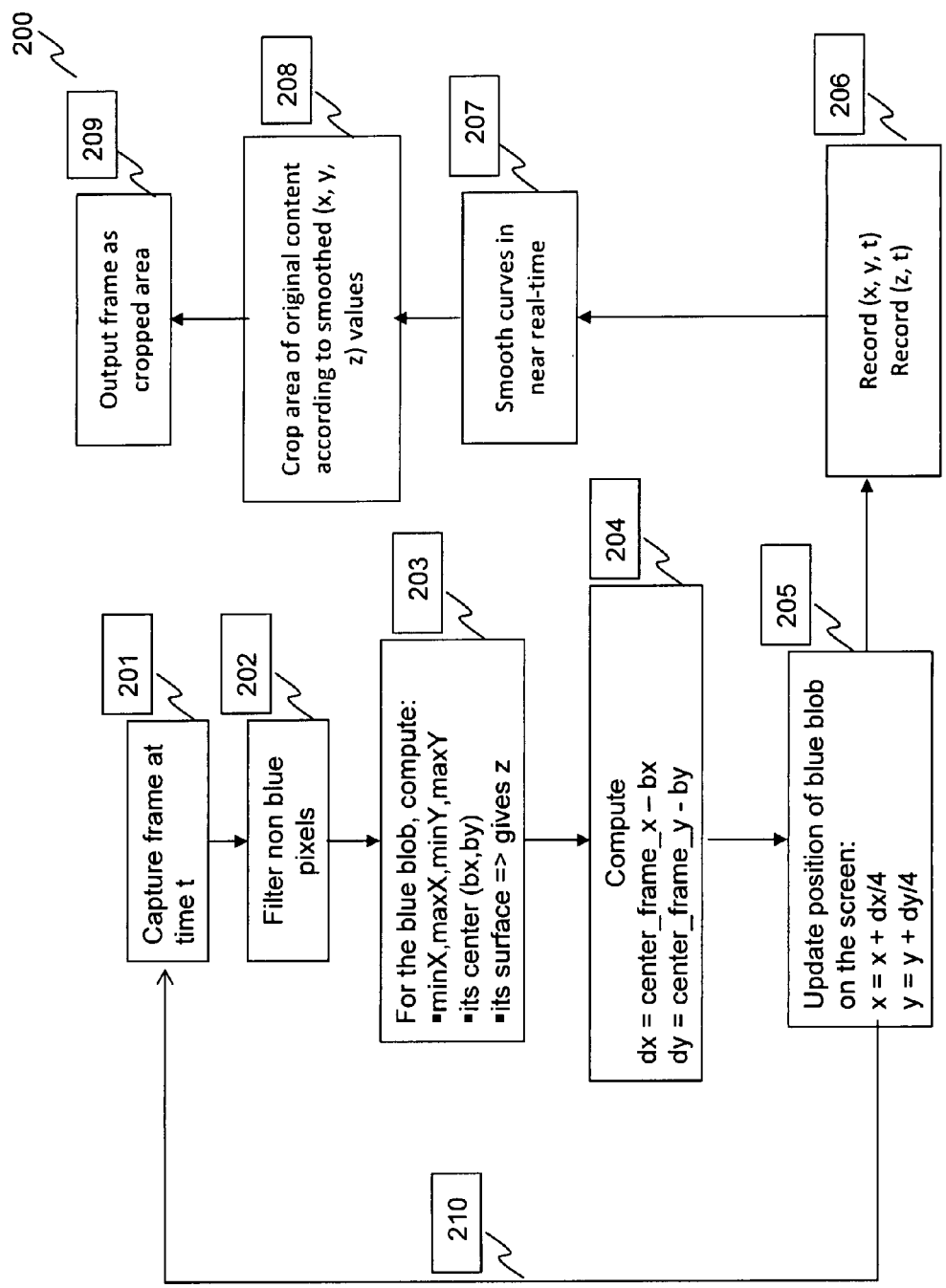
FIG. 2 illustrates an exemplary operating sequence of an embodiment of an inventive system.

The remaining steps will be described with reference to FIG. 2. At step 201, the system grabs a frame from the camera, which corresponds to a time t. At step 202, the system filters out non-blue pixels in order to facilitate the detection of the blue circle, rectangle or quadrilateral on the screen. At step 203, the position of the blob that corresponds to the blue circle, rectangle or quadrilateral is computed. Specifically, the embodiment of the inventive system may determine the positions of the edges of the blob (minX, maxX, minY, maxY) in both horizontal (X) and vertical (Y) directions, respectively. After that, the position of the center of the blob bx and by as well as its surface area may be computed. In one embodiment, the surface area of the blob is used to determine the distance of the camera 102 from the screen 101 by mapping the measured size of the circle or rectangle to the inverse distance from the screen.

After the embodiment of the inventive system computes the position of the center of the blob at step 203, the system moves the position of the virtual flash light by the inverse amount in step 204. For example, if the blob is found to be to the bottom/left of the center of the webcam's frame, the system moves the blue circle, rectangle or quadrilateral to the right and to the top. To accommodate for user's unintentional gestures, the system does not move the blue circle, rectangle or quadrilateral if the blob is found to already be near the center of the frame captured by the webcam. The new position of the blob on the screen is updated in step 205. This loop 210 ensures that the system moves the blue circle, rectangle or quadrilateral wherever the user is pointing the webcam.

To estimate pan and tilt of the camera, an embodiment of the inventive system uses a method described in detail in U.S. patent application Ser. No. 11/838,817, filed on Aug. 14, 2007, which is incorporated by reference herein in its entirety. The distance of the camera 102 to the screen is computed using the surface area of the blob. To this end, the embodiment of the inventive system computes the width and height of the blob and resizes the blue circle, rectangle or quadrilateral accordingly. For example, the size of the blob is adjusted so that its width always occupies one fourth of the width of the frame. For each frame taken at step 201, the embodiment of the inventive system records the time of the frame t, view parameters, which may include the position (x, y) of the blob on the screen, as well as the distance from the camera to the screen z. In another embodiment of the invention, the system may record the orientation parameters of the camera such as camera angle with respect to the screen. Thus, at step 206, the camera view information is recorded as a time series of three or four dimensional points. For each time t, the recorded information includes x, y of the blue circle, rectangle or quadrilateral on the display; size of the blue circle, rectangle or quadrilateral and, if available, rotational information of the camera with respect to the display.

In an embodiment of the invention, at step 207, the recorded view parameters are smoothed using, for example, splines. In an embodiment of the invention, a parametric 2D spline is computed to fit the (x,y) coordinates in time. A parametric 1D spline is computed to fit the successive sizes of the blue circle, rectangle or quadrilateral. Using these two smoothed curves, the embodiment of the inventive system then generates a series of frames from the original material that was displayed at capture time.

Starting from time t=0 and progressing onward, the system reads the 2D location given by the first spline and the 1D size given by the second spline. Using these parameters, the system unambiguously determines the area of the original picture (or video clip frame) to crop. In accordance with this determination, the embodiment crops the frame and writes it as output frame for time t, see step 208. If rotational information is also available, the original image is first rotated by the corresponding angle and then cropped: this ensures that no black corners are shown. The cropped area of the frame is output at step 209.

Because fitting 2D and 1D splines depends only on a few points and not the entire series, the system is also capable of generating the smooth animation in near real-time. This is useful when the system is used in a collaborative manner as will be describe in the exemplary application scenarios below.

In an embodiment of the invention, the user is enabled to control an aspect ratio of the cropped frames output by the inventive system in the aforesaid step 209. One embodiment of the system utilizes computer keyboard or one or more controller keys to change the aforesaid aspect ratio. An embodiment of the inventive system may also transform the frames (images) of the multimedia material to simulate a new camera angle, as determined by the position and orientation of the viewport with respect to the original frames (images) displayed on the computer screen. An embodiment of the inventive system then assembles the cropped and/or transformed frames (images) into one or more movie clips. The user is then provided with a facility to add sound effects to the aforesaid movie clip(s).

Exemplary application scenarios of an embodiment of the inventive system will now be described. A user has taken pictures and a few video clips of his daughter's birthday party. The system shows him the pictures and video clips in a classic slideshow mode in which pictures are shown for a few seconds and video clips are played back in their entirety. During the slideshow, the user uses his webcam to focus on specific areas of the media. User also narrates as he pans and zooms, and when he is finished adds a music clip of his daughter playing her new clarinet that he recorded on a separate device. He then emails his newly generated clip to his family and uploads it to his private YouTube archive.

A first user, a plumber, finds that he needs to stop a leak on a fixture he has not before encountered. His company has an archive of training videos and he could attempt to search through the archive and review video on his mobile device. However, this is extremely difficult for two reasons: 1) Like most mobile devices, his device has only intermittent network connectivity and searching through a large set of videos would take and inordinate amount of time; 2) The videos were originally designed for a larger screen and are too difficult to see on a small screen. Instead he contacts a second user at the company's headquarters. The second user plays back a video clip of how to stop the leak on her screen, but instead of streaming the whole clip to first user's mobile device, the second user uses her webcam to only send the most crucial elements and furthermore narrates over the video to provide the first user context that he otherwise would only have discovered from watching the entire video.

An embodiment of the inventive system supports composing a larger video out of a series of smaller clips. Transitions between clips can be user-defined, such as fading. Alternatively, the system can automatically interpolate between two clips, smoothly adjusting the viewport (including the x, y, and z positions as well as the tilt, pan, and cant) from the end of the first clip to the beginning of the next clip. This automatic method can also be used within clips when the viewport jumps from one part of the screen to another (because, for example, the user has turned the camera completely away from the screen in the interim).

Note that there are many known methods for detecting the current location of the camera when it jumps to a different part of the screen and "loses" the blue blob. One such well-known approach is based on Datamatrix™ tags, which was previously applied to identifying a cursor location using a cell phone camera.

It should be noted that the webcam shown in FIG. 1 represents just one embodiment of the inventive input controller, but other embodiments are possible. For example, the Wii™ controller, well known to persons of ordinary skill in the art, is capable of 5-degrees of freedom (3 via an IR sensor and another 3 via an accellerometer) and can be used to control the viewport in a direct manner similar to the webcam. One embodiment of the invention utilizes the aforesaid Wii™ controller as an inventive viewport and uses its keys to control the 6th degree, the yaw, of the "flashlight." In that implementation, to control the (x,y) position, the system relies on the Wii™'s internal infrared sensor. In one implementation, in place of the standard Wii™ sensor bar, the system uses two infrared flashlights to derive the x and y location of the Wii™. To control the distance of the flash light to the screen (z), the system uses the measured distance between the two infrared flashlights emitted by Wii™. Since the flashlights are a fixed distance apart, the distance increases as the Wii™ is increasingly closer to the screen. While the Wii™ controller includes an accelerometer which relies on gravitational pull to measure static forces, it cannot record pan (yaw). Thus, its place the embodiment of the inventive system uses the Wii™'s arrow keys to control both pan and tilt. To control the cant (roll) coordinate, the system relies on the Wii™'s accelerometer to map directly the cant of the Wii™ to the cant of the viewport. Finally, the implementation of the system uses the Wii™'s + and − keys to control the aspect ratio of the frames being captured.

Figure 3:
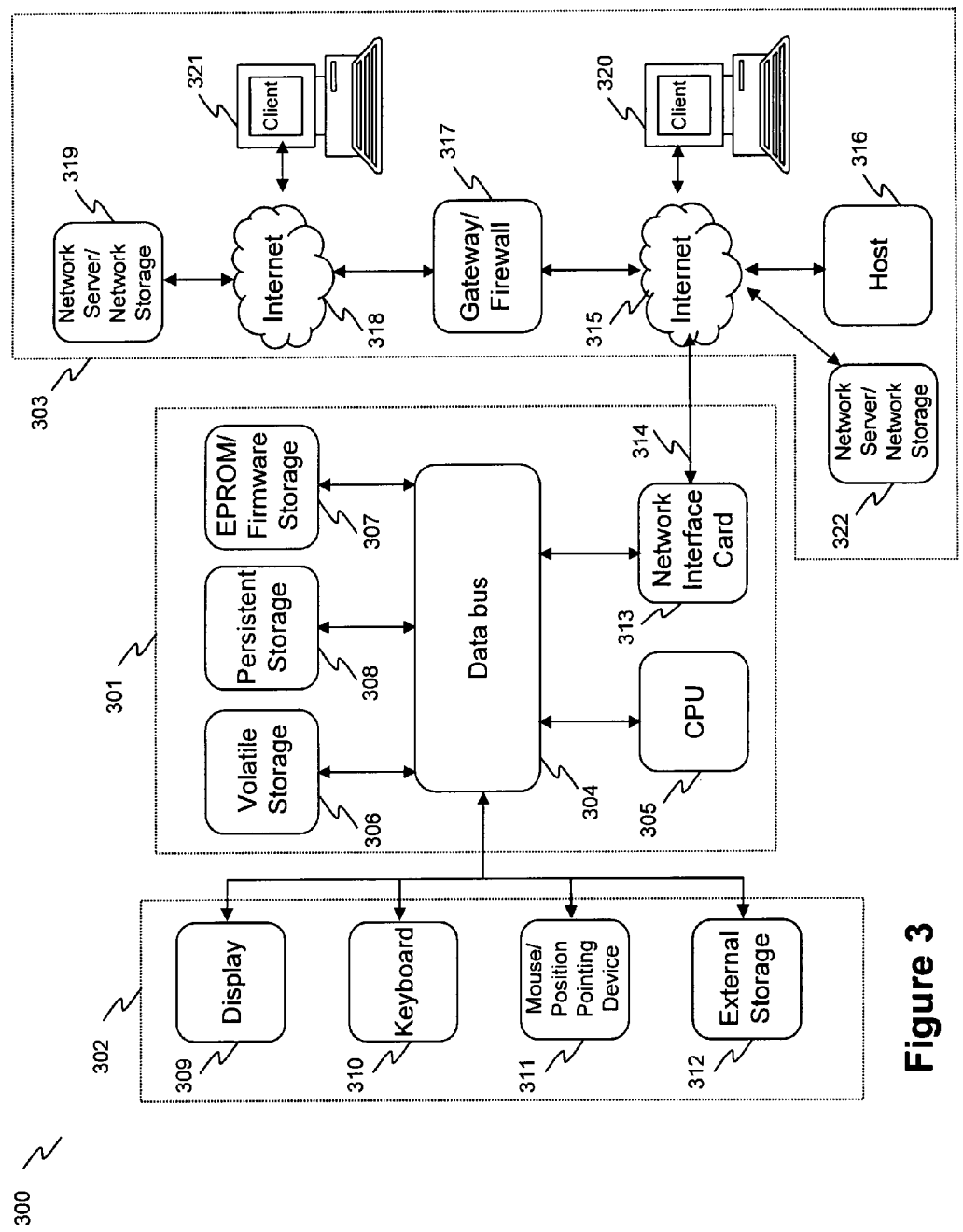
FIG. 3 illustrates an exemplary embodiment of a computer platform upon which the inventive system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 310, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be connected to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive system may reside on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 308. Volatile media includes dynamic memory, such as volatile storage 306. Transmission media includes coaxial cables, copper wire and fiber optics, including the wires that comprise data bus 304.

Common forms of computer-readable media include, for example, a floppy disk, a flexible disk, hard disk, magnetic tape, or any other magnetic medium, a CD-ROM, any other optical medium, a RAM, a PROM, an EPROM, a FLASH-EPROM, a flash drive, a memory card, any other memory chip or cartridge or any other tangible medium from which a computer can read.

Various forms of computer readable media may be involved in carrying one or more sequences of one or more instructions to processor 305 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is connected to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth™ may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Computer platform 301 can send messages and receive data, including program code, through the variety of network (s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in an inventive input controller. It is intended that the specification and examples be considered as exemplary only, with a true scope and spirit of the invention being indicated by the following claims.

What is claimed is:

1. An input control system comprising:
   a. a processing controller operable to cause an image feature to be created on a display showing a multimedia material; and
   b. a camera operatively coupled to the processing controller and operable to generate an image of the image feature, wherein the processing controller is operable to:
      i. use the image of the image feature to iteratively update a position of the image feature on the display, the position of the image feature being determined by a position of the camera;
      ii. record the position of the image feature for each iteration; and
      iii. transform the multimedia material based on the recorded position of the image feature;
   wherein the multimedia material comprises at least two frames and wherein transforming the multimedia material comprises cropping the at least two frames of the multimedia material in accordance with the position and a size of the image feature;
   wherein the processing controller is further operable to smooth the position of the image feature on the display using a spline.

2. The input control system of claim 1, wherein the image feature comprises a colored circle, a colored rectangle or a colored quadrilateral.

3. The input control system of claim 1, wherein the processing controller is further operable to calculate a surface area of the image feature and to use the calculated surface area to determine a distance between the camera and the display.

4. The input control system of claim 1, wherein using the image comprises filtering out a color of the image feature from the multimedia material shown on the display.

5. The input control system of claim 1, wherein the camera is a webcam.

6. The input control system of claim 1, further comprising assembling the cropped at least two frames into a video clip.

7. The input control system of claim 1, wherein the processing controller is further operable to use the image of the image feature to determine an angle of the camera with respect to the display and to transform the multimedia material based on the determined angle.

8. The input control system of claim 1, wherein the multimedia material comprises multiple frames and wherein the processing controller is further operable to generate at least two video clips using the transformed multimedia material and wherein the processing controller is further operable to interpolate a transition between the at least two video clips.

9. A method comprising:
   a. Creating an image feature on a display showing a multimedia material;
   b. Generating an image of the image feature using a camera;
   c. Using the image of the image feature to iteratively update a position of the image feature on the display, the position of the image feature being determined by a position of the camera;
   d. Recording the position of the image feature for each iteration;
   Transforming the multimedia material based on the recorded position of the image feature; and,
   smoothing the position of the image feature on the display using a spline; wherein the multimedia material comprises at least two frames and wherein transforming the multimedia material comprises cropping the at least two frames of the multimedia material in accordance with the position and a size of the image feature.

10. The method of claim 9, wherein the image feature comprises a colored circle, a colored rectangle or a colored quadrilateral.

11. The method of claim 9, further comprising calculating a surface area of the image feature and using the calculated surface area to determine a distance between the camera and the display.

12. The method of claim 9, wherein using the image comprises filtering out a color of the image feature from the multimedia material shown on the display.

13. The method of claim 9, wherein the camera is a webcam.

14. The method of claim 9, further comprising assembling the cropped at least two frames into a video clip.

15. The method of claim 9, further comprising using the image of the image feature to determine an angle of the camera with respect to the display and to transform the multimedia material based on the determined angle.

16. The method of claim 9, wherein the multimedia material comprises multiple frames and wherein the method further comprises generating at least two video clips using the transformed multimedia material and interpolating a transition between the at least two video clips.

17. A non-transitory computer-readable medium embodying computer-readable instructions implementing a method comprising:
   a. Creating an image feature on a display showing a multimedia material;
   b. Generating an image of the image feature using a camera;
   c. Using the image of the image feature to iteratively update a position of the image feature on the display, the position of the image feature being determined by a position of the camera;
   d. Recording the position of the image feature for each iteration;
   Transforming the multimedia material based on the recorded position of the image feature; and
   smoothing the position of the image feature on the display using a spline; wherein the multimedia material comprises at least two frames and wherein transforming the multimedia material comprises cropping the at least two frames of the multimedia material in accordance with the position and a size of the image feature.

18. The method of claim 1, wherein the position of the image feature is derived from a two dimensional spline and the size of the image feature is derived from a one dimensional spline, and wherein the cropping is conducted based on an area determined from the size and position of the image feature.

* * * * *